United States Patent
Toyoda (10) Patent No.: US 6,940,249 B2
(45) Date of Patent: Sep. 6, 2005

(54) INVERTER DEVICE

(75) Inventor: Masaru Toyoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 112 days.

(21) Appl. No.: 10/361,594

(22) Filed: Feb. 11, 2003

(65) Prior Publication Data

US 2004/0041535 A1 Mar. 4, 2004

(30) Foreign Application Priority Data

Sep. 4, 2002 (JP) ..................................... P2002-259137

(51) Int. Cl.[7] .............................. H02P 1/46; H02P 3/18; H02P 5/28; H02P 7/36
(52) U.S. Cl. ........................ 318/700; 318/780; 318/787; 318/813
(58) Field of Search ................................ 318/254, 700, 318/701, 138, 439, 712, 721, 803, 811, 599, 767, 772, 787, 778–780, 812, 807, 813; 363/65, 132, 71, 98, 41, 49, 70

(56) References Cited

U.S. PATENT DOCUMENTS

| | | | | |
|---|---|---|---|---|
| 4,259,620 A | * | 3/1981 | Oates et al. ............... | 318/802 |
| 4,389,606 A | * | 6/1983 | Detering .................... | 318/712 |
| 4,695,776 A | * | 9/1987 | Dishner et al. ............. | 318/14 |
| 5,099,409 A | * | 3/1992 | Bando et al. ............... | 363/54 |
| 5,564,831 A | * | 10/1996 | Bashark ..................... | 374/141 |
| 5,638,263 A | * | 6/1997 | Opal et al. ................. | 363/65 |
| 5,835,676 A | * | 11/1998 | Komatsu et al. ........... | 388/811 |
| 5,852,554 A | * | 12/1998 | Yamamoto .................. | 363/71 |
| 5,909,061 A | * | 6/1999 | Sasaki et al. ............... | 307/44 |
| 5,999,428 A | * | 12/1999 | Dahler et al. ............... | 363/71 |
| 6,169,676 B1 | * | 1/2001 | Dahler et al. ............... | 363/71 |
| 6,229,722 B1 | * | 5/2001 | Ichikawa et al. ........... | 363/71 |
| 6,262,896 B1 | * | 7/2001 | Stancu et al. ............... | 363/17 |
| 6,377,478 B1 | * | 4/2002 | Morishita .................... | 363/34 |
| 6,611,125 B2 | * | 8/2003 | Nagata et al. .............. | 318/727 |

FOREIGN PATENT DOCUMENTS

| | | |
|---|---|---|
| JP | SHOU 55-106094 | 8/1980 |
| JP | HEI 10-66372 | 3/1998 |

OTHER PUBLICATIONS

Translation of JP10066372.*

* cited by examiner

Primary Examiner—Marlon T. Fletcher
Assistant Examiner—Renata McCloud
(74) Attorney, Agent, or Firm—Sughrue Mion, PLLC (57) ABSTRACT

An inverter device capable of smoothly driving an alternating current synchronous motor of large capacity and high-speed rotation is provided. The inverter device includes a power rectification main circuit for converting alternating current power into direct current power and a PWM control inverse transformation main circuit. A transformer raises output terminal of the alternating current power of the inverse transformation main circuit to drive an alternating current synchronous motor. The alternating current motor is started bypassing the transformer and limiting output voltage of the inverse transformation main circuit to a low value through PWM control of the inverse transformation main circuit. After a predetermined time, the bypass circuit is interrupted and switched to a circuit via the transformer, and the output voltage of the inverse transformation main circuit is raised through PWM control of the inverse transformation main circuit, thus the alternating current synchronous motor is brought into normal operation.

18 Claims, 11 Drawing Sheets

(PRIOR ART)

(PRIOR ART)

INVERTER DEVICE

BACKGROUND OF THE INVENTION

1. Field of the Invention

The present invention relates to a voltage-fed inverter device for use in speed control of an alternating current synchronous motor.

2. Description of the Related Art

Figure 10:
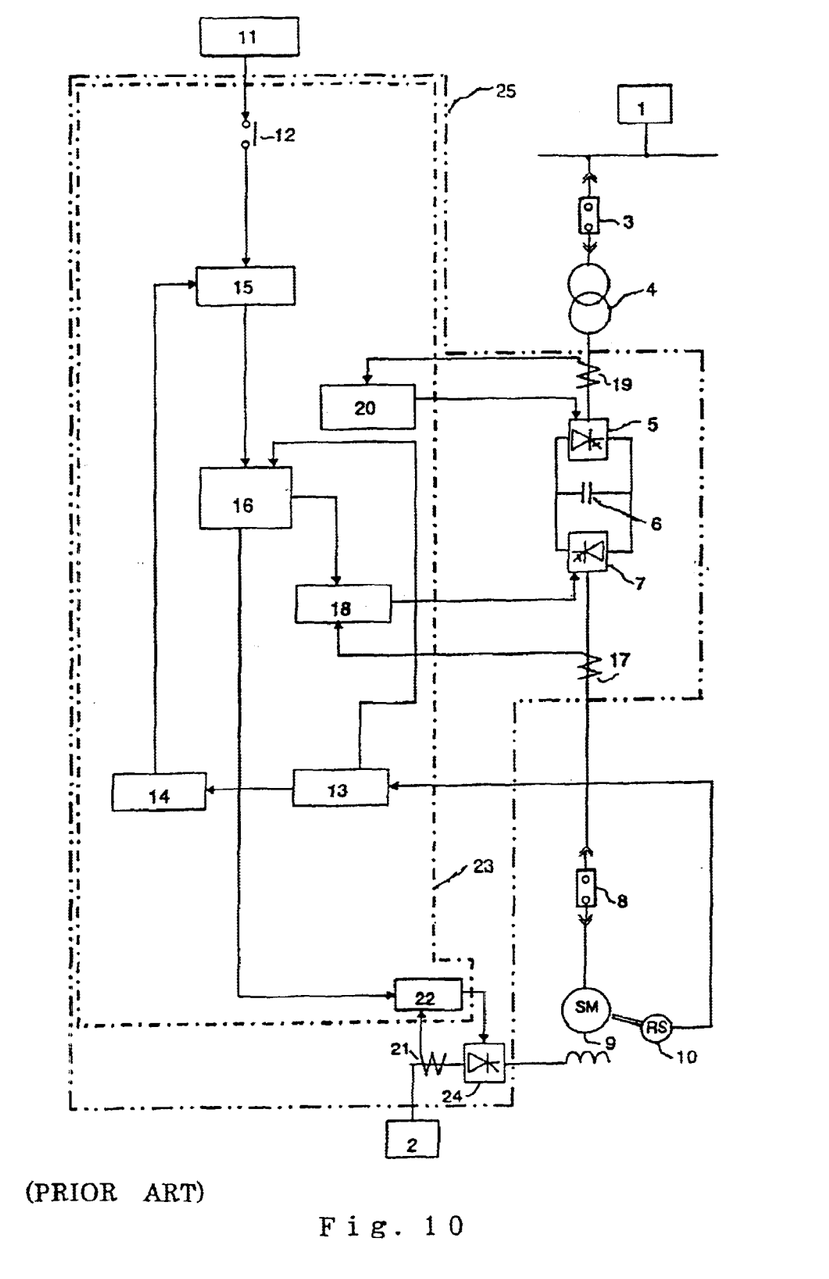
FIG. 10 is a circuit diagram showing an inverter device according to the prior art.

FIG. 10 is a system arrangement diagram of a conventional inverter device, for example, disclosed at page 94 of "New Drive Electronics" edited by Naohiko Ueyama and published by Denki Shoin. This conventional inverter device includes a commercial alternating current power supply 1 for main circuit, a commercial alternating current power supply 2 for field system, a breaker 3, an input transformer 4, a main circuit 5 for power rectification using a semiconductor device (hereinafter referred to as power rectification main circuit), a smoothing capacitor 6, a main circuit 7 for inverse transformation using a semiconductor device (hereinafter referred to as inverse transformation main circuit), a breaker 8, an alternating current motor 9 driven by the inverter 7, and a resolver 10.

Figure 11:
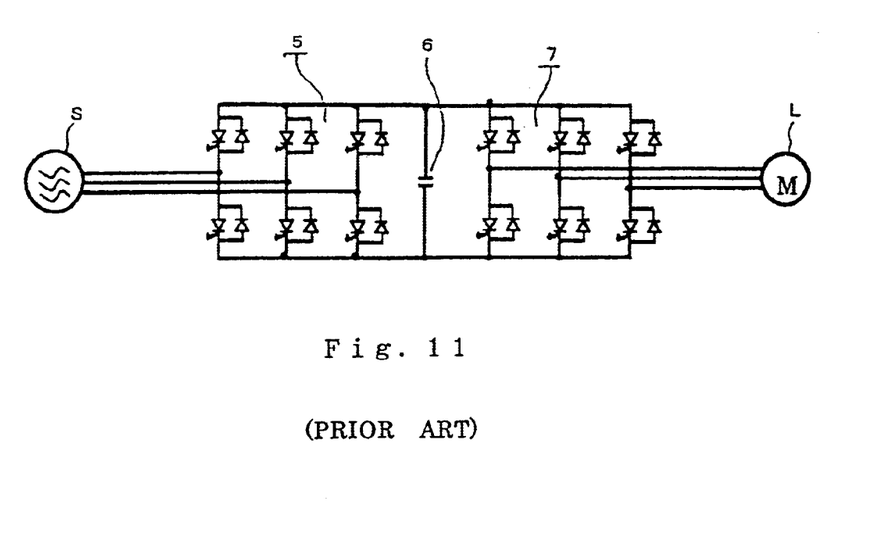
FIG. 11 is a diagram showing an example of a power rectifier main circuit and an inverse transformation main circuit.

In the actual arrangement of the foregoing power rectification main circuit 5 and inverse transformation main circuit 7, as illustrated in FIG. 11, the power rectification main circuit 5 for converting alternating current power into direct current power is a circuit arranged by connecting series circuits, each composed of at least two electric switches connected in series with their conduction period controlled, in parallel by a predetermined number of phases, and a middle point of each series circuit is connected to an alternating current power supply S. On the other hand, the inverse transformation main circuit 7 for converting direct current power into alternating current power is a circuit arranged by connecting series circuits, each composed of at least two electric switches connected in series with their control period controlled, in parallel by a predetermined number of phases, and a middle point of each series circuit is connected to an alternating current load L.

The mentioned conventional inverter device also includes: an outside speed command generator 11; a contact 12 that acts to be turned on by an operation command signal from outside of an inverter circuit 25; a phase detector 13 that detects a phase on the basis of a signal outputted by the resolver 10; a speed detector 14 that computes a speed on the basis of a phase signal outputted by the phase detector 13; a speed controller 15 that compares a speed reference signal outputted by the outside speed command generator 11 with a speed feedback value outputted by the speed detector 14 and generates a current reference signal; an arithmetic circuit 16 that generates a main circuit current reference signal and a field current command signal on the basis of the current reference signal outputted by the speed controller 15 and the phase signal outputted by the phase detector 13; and a control circuit 18 that generates a current command value by comparing the main circuit current reference signal outputted by the arithmetic circuit 16 with a current feedback value of the inverse transformation main circuit 7 detected by a main circuit current sensor 17 and brings a gate signal of the semiconductor device of the inverse transformation main circuit 7 under PWM control according to the current command value.

The mentioned conventional inverter device further includes: a current sensor 19 that detects a power rectification main circuit current feedback value; a converter control circuit 20 that transmits and controls a gate signal of the semiconductor of the power rectification main circuit 5 using a direct current voltage command value preliminarily set in the mentioned current sensor 19 and an output of the mentioned current sensor 19; a field current sensor 21; a control circuit 22 that compares the field current command signal of the arithmetic circuit 16 with a field current feedback value detected by the current sensor 21 and controls a field current; and a field thyristor power supply 24. In addition, numeral 23 indicates an inverter control circuit, and numeral 25 indicates an inverter circuit for PWM control.

Operation of the mentioned conventional inverter system is now described. The arithmetic circuit 16 computes and obtains a main circuit current reference signal on the basis of a current reference signal of the speed controller 15 obtained by comparing and computing a speed reference signal from the outside speed command generator 11 with a speed feedback signal of the speed detector 14, as well as on the basis of a phase signal of the phase detector 13. The control circuit 18 compares the main circuit current reference signal outputted by the arithmetic circuit 16 with a main circuit alternating current feedback value of the inverse transformation main circuit 7 detected by the main circuit current sensor 17 and obtains a current command value. Then a gate signal under PWM control is added to the gate of the semiconductor of the inverse transformation main circuit 7 based on the current command value from the control circuit 18, thereby controlling strength of the current flowing through the alternating current motor 9. Therefore, a deviation value of the speed reference signal and the speed feedback signal represents the strength of the current flowing through the alternating current motor 9, and the flowing current becomes stronger as the deviation is larger.

As described above, in the system for controlling drive of the alternating current motor 9 by the inverter circuit 25, in a case where the alternating current motor 9 driven by the inverter circuit 25 is a synchronous motor, the alternating current motor 9 is driven with a voltage determined by a rated voltage value of the power semiconductor used in the inverse transformation main circuit 7 of the inverter circuit 25, and an alternating current output voltage generated by the inverse transformation main circuit 7 is lower than motor rated voltage in case of a motor driven with a commercial power supply.

Moreover, since the resolver 10 is used for the purpose of detecting a position of an armature of the alternating current motor 9, the resolver cannot resist high-speed rotation of the alternating current motor 9, and the conventional system is not applicable to a motor driven at a high speed.

SUMMARY OF THE INVENTION

The present invention was made to solve the above-discussed problems and has an object of providing an inverter device in which a step-up transformer is connected to an output of an inverter circuit to supply a high voltage to a motor, whereby smooth drive is achieved and the motor voltage is raised as high as a motor rated voltage of the motor driven with a commercial power supply.

Another object of the invention is to provide an inverter device in which a distributor is used to detect a position of an armature, thereby being capable of coping with a motor driven at a high-speed.

In order to accomplish the foregoing objects, an inverter device according to the invention includes: at least one combination of a power rectification circuit for converting alternating current power into direct current power and a PWM control inverter circuit connected to a direct current output terminal of the mentioned power rectification circuit and arranged by connecting series circuits, each being composed of at least two electric switches connected in series with their conduction period controlled by a drive control signal, in parallel by a predetermined number of phases so that an alternating current power is outputted from a middle point of each series circuit, and in which a voltage of an output terminal of the mentioned alternating current power is raised by a transformer, thereby driving an alternating current synchronous motor. This inverter device is further provided with a bypass circuit for bypassing the mentioned transformer, and when the mentioned alternating current synchronous motor is driven by bringing the mentioned inverse transformation main circuit under the PWM control conforming to a current reference signal obtained by comparing a speed reference signal with a speed feedback signal of the alternating current synchronous motor, the motor is started with the mentioned transformer being bypassed by the mentioned bypass circuit and output voltage of the mentioned inverse transformation main circuit being limited to a low value through the PWM control of the mentioned inverse transformation main circuit, and after passing a predetermined time, the mentioned bypass circuit is interrupted and switched to a circuit via the transformer and the output voltage of the mentioned inverse transformation main circuit is raised through the PWM control of the mentioned inverse transformation main circuit, whereby the mentioned alternating current synchronous motor is brought into normal operation.

As a result, the output voltage of the inverter can be raised through the output transformer, and the motor is started through the circuit without any transformer. Consequently it is possible to prevent the transformer from occurrence of magnetic saturation. Further, it is possible to obtain a reliable inverter device capable of driving an alternating current motor having a rated voltage higher than that of the inverter device and, furthermore, switching a maximum voltage limit value generator and controlling the output voltage of the inverse transformation main circuit under the PWM control ensure smooth starting of the motor.

Another inverter device according to the invention includes: N combinations of a power rectification circuit for converting alternating current power inputted from a multi-winding transformer into direct current power and a PWM control inverter circuit connected to a direct current output terminal of the mentioned power rectification circuit and arranged by connecting series circuits, each being composed of at least two electric switches connected in series with their conduction period controlled by a drive control signal, in parallel by a predetermined number of phases so that an alternating current power is outputted from a middle point of each series circuit, and in which a voltage of an output terminal of the mentioned alternating current power is raised by the multi-winding transformer. This inverter device is further provided with a bypass circuit for bypassing the mentioned transformer through an alternating current reactor for coupling at least two of the mentioned N combinations of inverse transformation main circuits, and when the mentioned alternating current synchronous motor is driven by bringing the mentioned inverse transformation main circuit under the PWM control conforming to a current reference signal obtained by comparing a speed reference signal with a speed feedback signal of the alternating current synchronous motor, the motor is started with the mentioned transformer being bypassed by the mentioned bypass circuit and output voltage of the mentioned inverse transformation main circuit being limited to a low value through the PWM control of the mentioned inverse transformation main circuit, and after passing a predetermined time, the mentioned bypass circuit is interrupted and switched to a circuit via the transformer and the output voltage of the mentioned inverse transformation main circuit is raised through the PWM control of the mentioned inverse transformation main circuit, whereby the mentioned alternating current synchronous motor is brought into normal operation.

As a result, it is possible to achieve a large capacity of inverter device easily, and an economical inverter device is obtained.

A further inverter device according to the invention includes: N combinations of a power rectification circuit for converting alternating current power inputted from a multi-winding transformer into direct current power and a PWM control inverter circuit connected to a direct current output terminal of the mentioned power rectification circuit and arranged by connecting series circuits, each being composed of at least two electric switches connected in series with their conduction period controlled by a drive control signal, in parallel by a predetermined number of phases so that an alternating current power is outputted from a middle point of each series circuit, and in which a voltage of an output terminal of the mentioned alternating current power is raised by the multi-winding transformer. This inverter device is further provided with a bypass circuit for bypassing the mentioned transformer and reaching from one inverter circuit to the mentioned alternating current synchronous motor, and when the mentioned alternating current synchronous motor is driven by bringing the mentioned inverse transformation main circuit under the PWM control conforming to a current reference signal obtained by comparing a speed reference signal with a speed feedback signal of the alternating current synchronous motor, the motor is started with the mentioned transformer being bypassed by the mentioned bypass circuit and output voltage of the mentioned inverse transformation main circuit being limited to a low value through the PWM control of the mentioned inverse transformation main circuit, and after passing a predetermined time, the mentioned bypass circuit is interrupted and switched to a circuit via the transformer and the output voltage of the mentioned inverse transformation main circuit is raised through the PWM control of the mentioned inverse transformation main circuit, whereby the mentioned alternating current synchronous motor is brought into normal operation.

As a result, on condition that a starting capacity (starting torque) of the alternating current motor is not more than a half of a rated capacity of two combinations of conversion circuits connected in parallel, it is possible to start the motor with only one combination of power rectification main circuit and inverse transformation main circuit. Consequently, it is possible to omit the coupling reactor, thus obtaining an economical inverter device.

The other objects and features of this invention will become understood from the following description with reference to the accompanying drawings.

DETAILED DESCRIPTION OF THE PREFERRED EMBODIMENTS

Embodiment 1.

Figure 1:
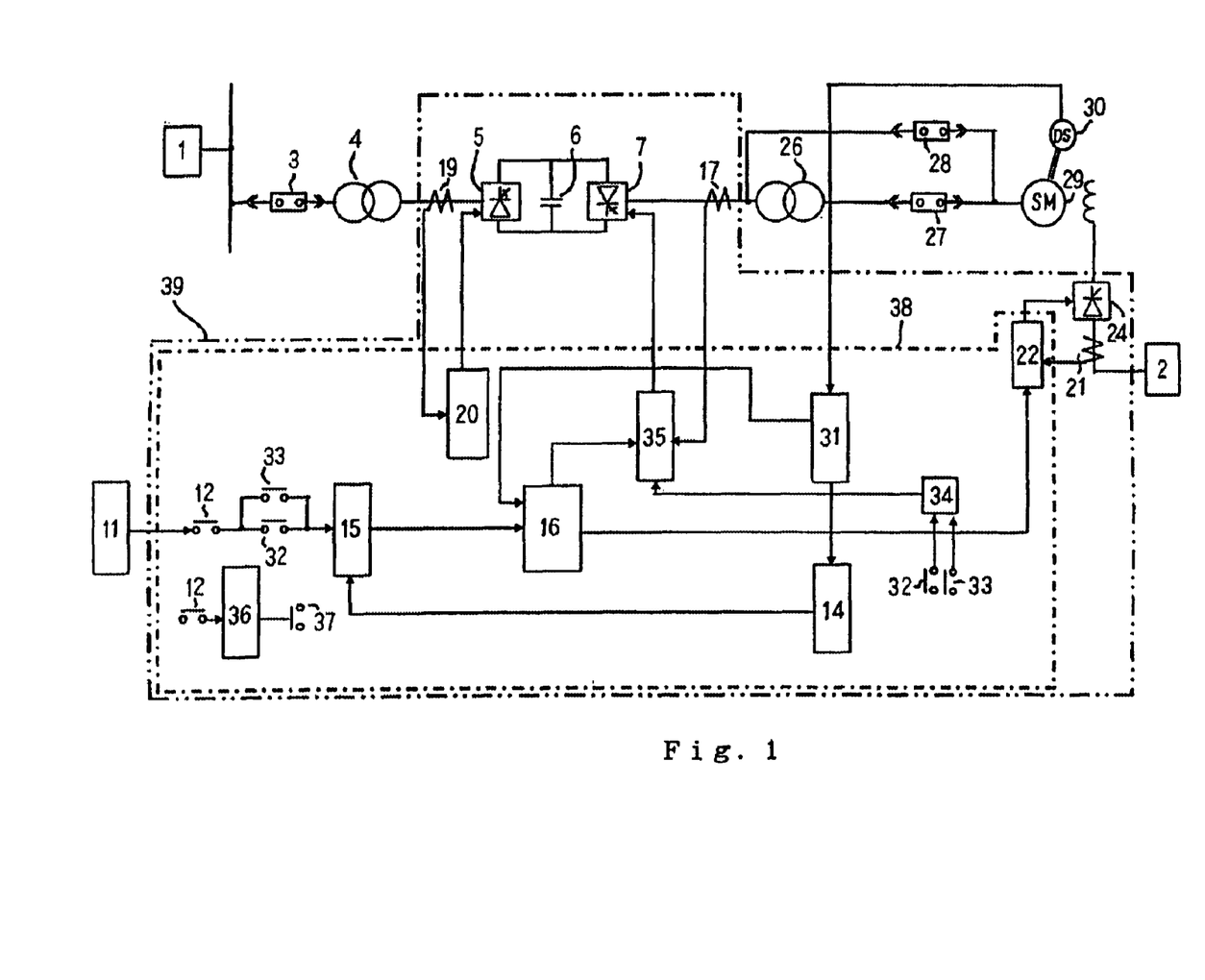
FIG. 1 is a circuit diagram showing an inverter device according to Embodiment 1 of the present invention.

Embodiment 1 of the invention is hereinafter described with reference to FIG. 1. An inverter device according to this Embodiment 1 includes a commercial alternating current power supply 1 for main circuit, a commercial alternating current power supply 2 for field system, a breaker 3, an input transformer 4, a main circuit 5 for power rectification using a semiconductor device (hereinafter referred to as power rectification main circuit), a smoothing capacitor 6, a main circuit 7 for inverse transformation using a semiconductor device (hereinafter referred to as inverse transformation main circuit), an alternating current synchronous motor 29 for high-voltage (hereinafter referred to as alternating current motor), an output transformer 26 for raising voltage interposed between the inverse transformation main circuit 7 and the alternating current motor 29, a breaker 27 connected in series to the output transformer 26, a breaker 28 that is connected to a bypass circuit for bypassing the output transformer 26 and closes when the operation command contact 12 is closed, and a distributor 30 for detecting a position of armature of the alternating current motor 29.

The inverter device also includes: an outside speed command generator 11; a contact 12 operated to turn on by an operation command signal transmitted from outside; a position detecting circuit 31 that detects a phase on the basis of a signal outputted by the distributor 30; a speed detector 14 that computes a speed on the basis of a position signal outputted by the position detecting circuit 31; a speed controller 15 that a speed reference signal outputted by the outside speed command generator 11 with a speed feedback value outputted by the speed detector 14 and generates a current reference signal; an arithmetic circuit 16 that generates a main circuit current reference signal and a field current command signal on the basis of the current reference signal outputted by the speed controller 15 and of a position detection signal of the position detecting circuit 31; and a control circuit 35 that generates a current command value by comparing the main circuit current reference signal outputted by the arithmetic circuit 16 with a current feedback value of the inverse transformation main circuit 7 detected by a main circuit current sensor 17 and brings a gate signal of the semiconductor device of the inverse transformation main circuit 7 under the PWM control according to the current command value.

The inverter device further includes: a current sensor 19 that detects a power rectification main circuit current feedback value; a converter control circuit 20 that transmits and controls a gate signal of the semiconductor of the power rectification main circuit 5 using a direct current voltage command value preliminarily set in the mentioned current sensor 19 and an output of the mentioned current sensor 19; a field current sensor 21; a control circuit 22 that compares the field current command signal of the arithmetic circuit 16 with a field current feedback value detected by the current sensor 21 and controls a field current; a field thyristor power supply 24; a position detecting circuit 31 that detects a rotational position of the armature of the alternating current motor 29 on the basis of a signal outputted by the distributor 30; a contact 32 interlocking in association with the breaker 28; a contact 33 interlocking in association with the breaker 27; and a maximum voltage limit value switch 34 for switching the output voltage of the inverse transformation main circuit 7 under the PWM control.

The inverter device still further includes: a control circuit 35 for bringing a gate signal of the semiconductor device of the inverse transformation main circuit 7 under the PWM control according to a current command value generated by comparing the main circuit current reference signal outputted by the circuit 16 with the current feedback value of the inverse transformation main circuit 7 detected by the main circuit current sensor 17 within a voltage limited by the maximum voltage limit value of the maximum voltage limit value switch 34; a timer 36 for turning a contact 37 on after passing a predetermined time from turning the contact 12 on; and a contact 37 for turning the breaker 28 off and turning the breaker 27 on at the same time. Numeral 38 indicates an inverter control circuit, and numeral 39 indicates an inverter circuit for PWM control.

Now, operation of the mentioned inverter device is hereinafter described. For starting and driving the alternating current motor 29 is started and driven through the inverter circuit 39, when turning on the operation command contact 12 of the inverter circuit 39 upon receiving a command from outside not shown in the drawing, the breaker 28 is turned on at the same time, whereby the alternating current motor 29 is supplied with an electric power through a path bypassing the output transformer 26 and is started. In the mentioned start of the motor, the contact 32 is turned on interlocking with the breaker 28, the output of the maximum voltage limit value switch 34 is limited to a low voltage without output transformer, and the control circuit 35 receives the output as a maximum voltage limit value. This maximum voltage limit value limits the output voltage of the inverse transformation main circuit 7 to be PWM controlled. Output voltage and frequency of the inverse transformation main circuit 7 are substantially in a constant ratio. Therefore, the output frequency of the inverse transformation main circuit 7 is not raised to any frequency exceeding the voltage capacity.

The contact 37 is turned on after passing a timer set time from turning the operation command contact 12 on by the timer 36 acting as a contact driving circuit. When turning the contact 37 on, the breaker 28 turns off (the contact 32 also turns off) by means of a driving circuit not shown in the drawing, and the breaker 27 is turned on instead. When turning the breaker 27 on, the contact 33 is turned on interlocking with the breaker 27, output of the maximum voltage limit value switch 34 is switched to a maximum voltage limit, which is a high voltage with an output transformer. Then, the control circuit 35 receives the output as a maximum voltage limit value. Consequently, the output voltage of the inverse transformation main circuit 7 under the PWM control comes to rise, the output frequency also rises at the same time, and rotation of the alternating current motor 29 rises up to a rated speed.

In a case of starting the alternating current motor 29 from a state of zero frequency through the output transformer 26, it is difficult to start the alternating current motor through the output transformer 26 because there is a possibility of magnetic saturation occurring in the output transformer 26. It is, however, possible to ensure smooth starting by switching the circuit to between the circuit without any transformer and the circuit with a transformer and switching the maximum voltage limit value switch 34, thereby controlling the output voltage of the inverse transformation main circuit under the PWM control as described above.

As a result, in this Embodiment 1, the output voltage of the inverter is raised through the output transformer 26, and the motor is started through the circuit without any transformer. Consequently, it is possible to prevent the transformer from occurrence of magnetic saturation and obtain a reliable inverter device capable of driving an alternating current motor having a rated voltage higher than that of the inverter device. Furthermore, since the distributor 30 is used as a position detector, the inverter device is applicable to any alternating current motor that is started and driven at a high-speed.

Embodiment 2.

Figure 2:
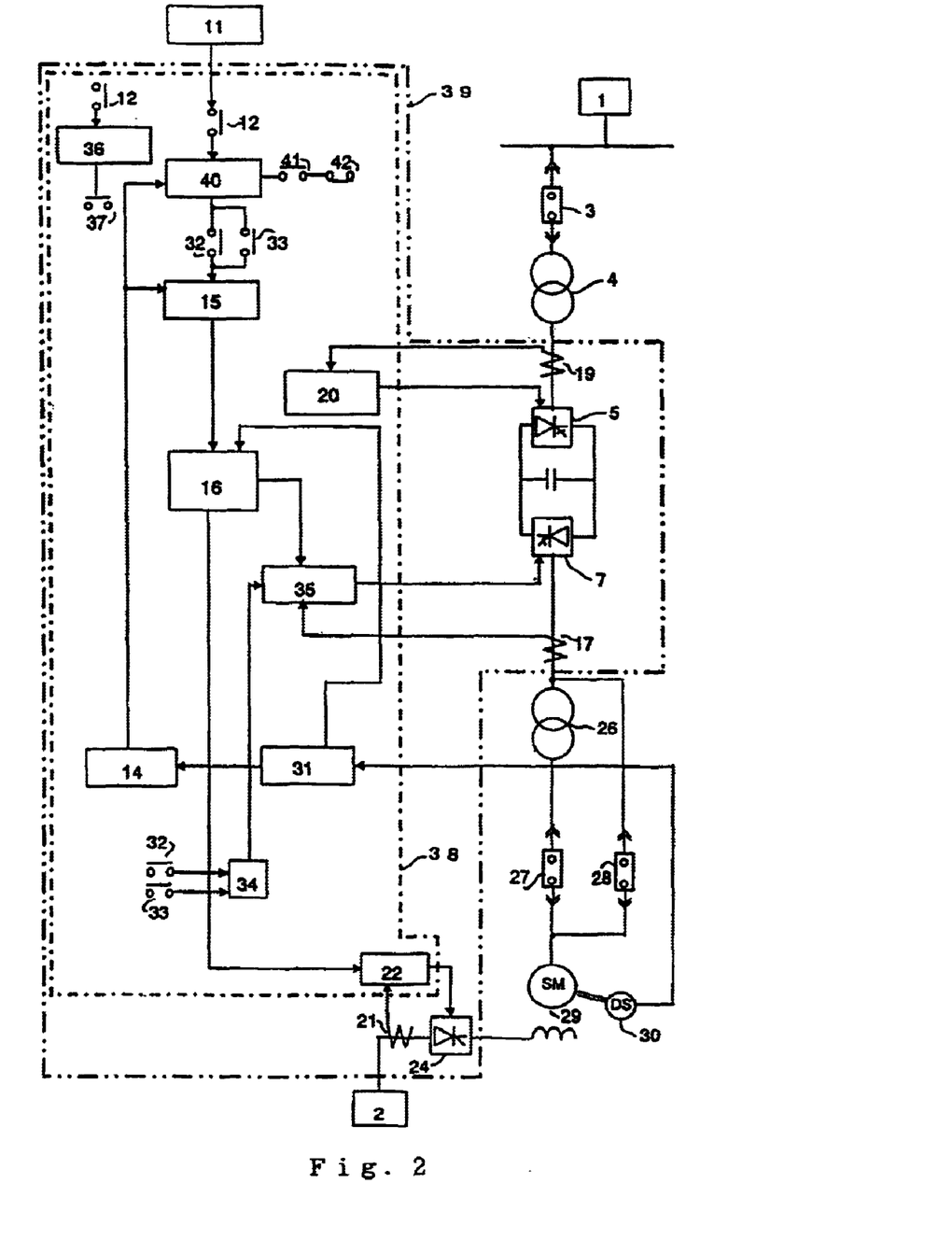
FIG. 2 is a circuit diagram showing an inverter device according to Embodiment 2 of the invention.

FIG. 2 is a circuit diagram showing an inverter device according to Embodiment 2 of the invention. The inverter device of this Embodiment 2 is different from the inverter device of Embodiment 1 in the aspect that a speed command gradient generator 40 is used as shown in FIG. 2. A command value of the speed command gradient generator 40 increases (or decreases) gradually with respect to the time base.

Referring to FIG. 2, the breaker 28 is turned on by an ON signal of the operation command contact 12 of the inverter circuit 39, and the alternating current motor 29 is started through the bypass circuit for bypassing the transformer 26. After passing a predetermined time, the contact 37 is turned on by an output of the timer 36, whereby the breaker 28 is turned off and the breaker 27 is turned on, thus being switched to the circuit for supplying a power to the alternating current motor 29 via the transformer 26. In this switching process, depending upon the operating time required for switching the breakers on and off, the alternating current motor 29 runs freely and the speed is reduced. As a result, a large deviation is produced between the speed reference value outputted by the outside speed command generator 11 and the speed feedback value outputted by the speed detector 14. Under such a situation, if the motor is brought into inverter operation through the circuit with a transformer again, the speed deviation in the operation will increase and the current command will rise, and there is a possibility of an overcurrent flowing from the inverse transformation main circuit 7 to the alternating current motor 29.

To cope with this, when the alternating current motor 29 is brought into inverter operation again through the circuit with the transformer 26, a combination of a contact 42 that works interlocking with off-operation of the breaker 28 and a contact 41 that works interlocking with on-operation of the breaker 27 is employed so that a value equal to the speed feedback value of the alternating current motor 29 is outputted by the speed detector 14 as an initial value of the speed command gradient generator 40. In this manner, it is possible to restrain an overcurrent generated when the alternating current motor 29 is brought into inverter operation through the inverter circuit 39 again. Furthermore, it is possible to make a start following the speed command value of the outside speed command generator 11 without delay with respect to an operation command inputted from outside not shown, thus the motor being able to start smoothly. Arrangement and operation other than the foregoing description are the same as those in FIG. 1.

Embodiment 3.

Figure 3:
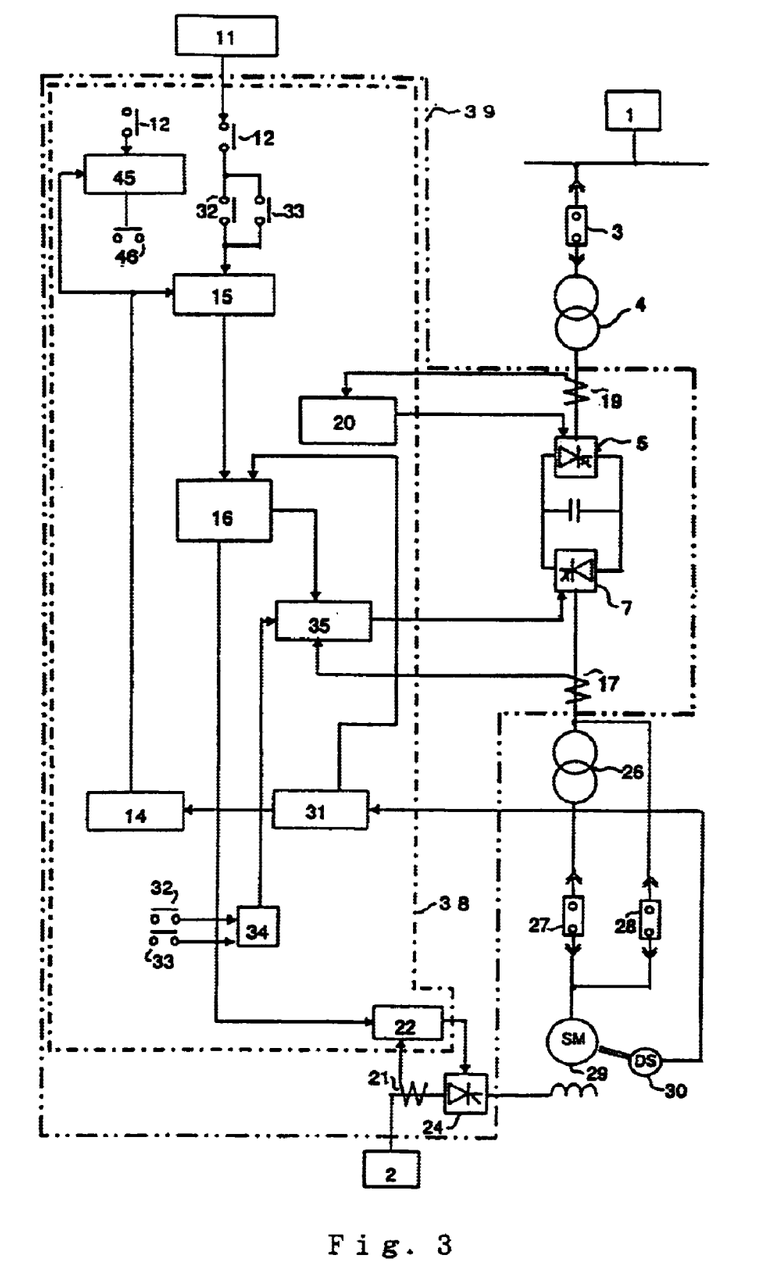
FIG. 3 is a circuit diagram showing an inverter device according to Embodiment 3 of the invention.

FIG. 3 shows a circuit diagram of an inverter device according to Embodiment 3 of the invention. In the foregoing Embodiment 1, the contact 37 operated by the timer 36 is used to switch to the circuit with a transformer or to the circuit without any transformer after the operation start command 12 is turned on as shown in FIG. 1. On the other hand, in this Embodiment 3, as shown in FIG. 3, a contact 46 that works when the speed feedback value of the speed detector 14 reaches a speed set by a speed determination circuit 45 turns the breaker 28 off and turns the breaker 27 on, whereby the alternating current motor 29 is brought into normal operation. Other arrangement is the same as that in FIG. 1, and further explanation is omitted here.

Therefore, in this Embodiment 3, unlike the case of using the timer to follow the speed command value of the outside speed command generator 11, the speed of bringing the motor into normal operation is not changed according to load conditions of the alternating current motor 29, and, as a result, it is possible to completely prevent the output transformer 26 from saturation.

Embodiment 4.

Figure 4:
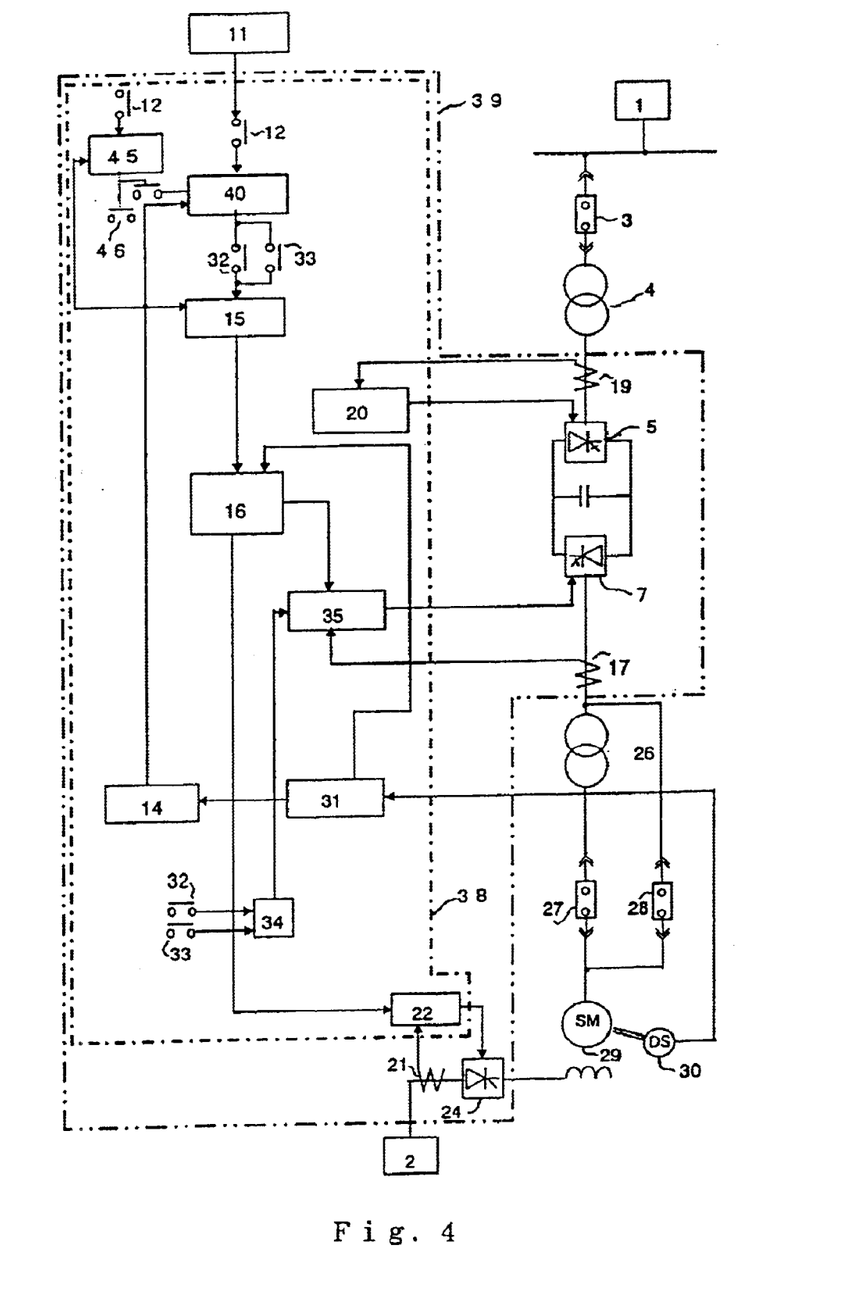
FIG. 4 is a circuit diagram showing an inverter device according to Embodiment 4 of the invention.

In the foregoing Embodiment 2, a timer is used to switch to the circuit with a transformer or to the circuit without any transformer and the speed command initial value given to the speed command gradient generator 40 is arranged to coincide with the speed feedback value outputted by the speed detector 14. On the other hand, in this Embodiment 4, as shown in FIG. 4, instead of using the timer, the breaker 28 is turned off and the breaker 27 is turned on by the contact 46 that works when the speed feedback value of the speed detector 14 reaches a speed set by the speed determination circuit 45, whereby the motor is brought into normal operation. Other arrangement is the same as that in FIG. 2, and further explanation is omitted here.

In this Embodiment 4, unlike the case of using the timer to follow the speed command value of the outside speed command generator 11, the speed of bringing the motor into normal operation is not changed according to load conditions of the alternating current motor 29, and it is possible to completely prevent the output transformer 26 from saturation. It is also possible to change the initial value setting of the speed command gradient generator 40 to a state suitable for the operation speed.

Embodiment 5.

In the foregoing Embodiments 1 to 4, the capacity of the alternating current motor 29 is not larger than the capacity of the one inverse transformation main circuit. On the other hand, in this Embodiment 5, plural (N) circuits each composed of a power rectification main circuit and an inverse transformation main circuit are connected in parallel in order to achieve an inverter device applicable to an alternating current motor of a large capacity.

Figure 5:
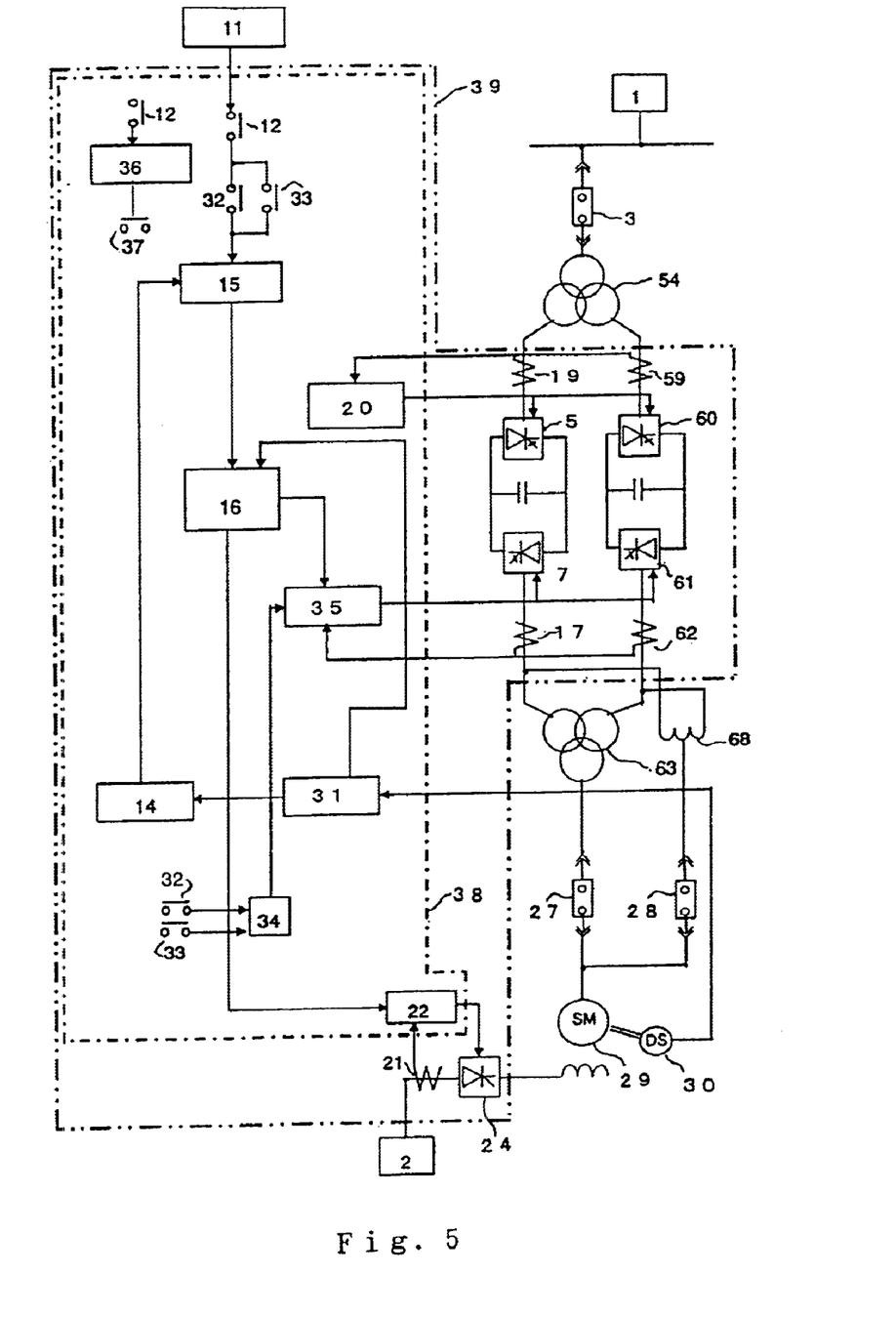
FIG. 5 is a circuit diagram showing an inverter device according to Embodiment 5 of the invention.

Referring to FIG. 5, the inverter device according to Embodiment 5 is provided with multi-winding transformers 54, 63, and 59, current sensors 59 and 62, a power rectification main circuit 60, an inverse transformation main circuit 61, and a coupling reactor 68 for coupling the inverse transformation main circuit 7 and the inverse transformation main circuit 61. A circuit composed of the foregoing power rectification main circuit 60 and the inverse transformation main circuit 61 is connected in parallel to a circuit composed of the power rectification main circuit 5 and the inverse transformation main circuit 7 through the multi-winding transformers 54 and 63. The breaker 28 of the bypass circuit is connected to the foregoing parallel circuit through the coupling reactor 68. Other arrangement and operation are the same as those in FIG. 1.

As described above, combining the multi-winding transformer 63 with the coupling reactor 68 makes it possible to increase the capacity of the inverter device and obtain an economical inverter device.

Embodiment 6.

In the foregoing Embodiment 5, the starting capacity (starting torque) of the alternating current motor 29 needs to be the whole capacity of the parallel circuit composed of two combinations (N combinations in general) of a power rectification main circuit and an inverse transformation main circuit. On the other hand, this Embodiment 6 provides a circuit arrangement of a case where the starting capacity (starting torque) of the alternating current motor needs to be not larger than a half of the rated capacity of the inverter circuit.

Figure 6:
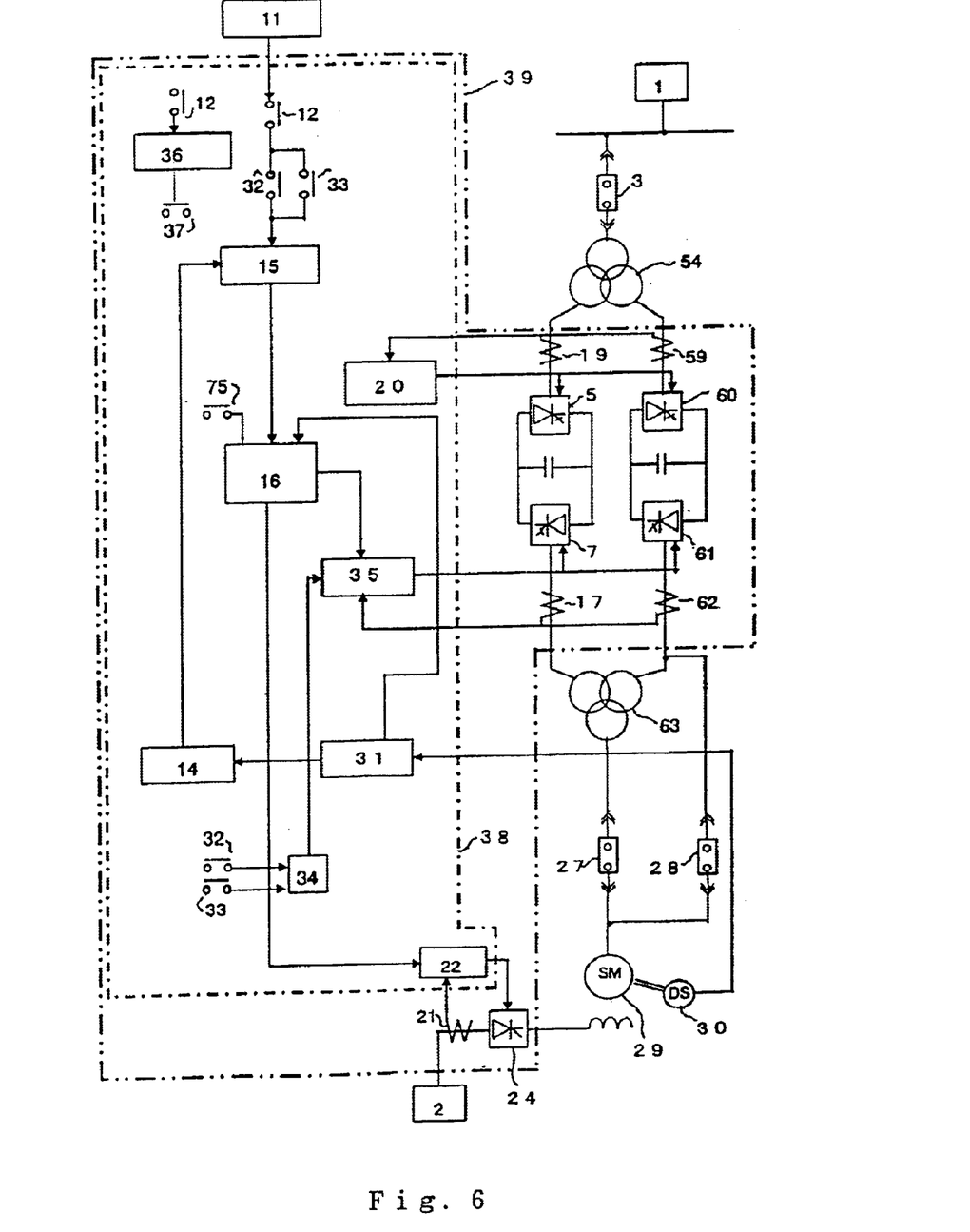
FIG. 6 is a circuit diagram showing an inverter device according to Embodiment 6 of the invention.

FIG. 6 shows a circuit diagram of Embodiment 6. As shown in FIG. 6, the bypass circuit having the circuit breaker 28 is directly connected to one 61 of the inverse transformation main circuits. A contact 75 is turned on interlocking with the contact 37 for switching circuit and causes to operate a command current value limiter contained in the arithmetic circuit 16. Other arrangement and operation are the same as those in FIG. 5.

When the starting capacity (starting torque) of the alternating current motor 29 is not larger than a half of the rated capacity of the inverter circuit 39, the contact 75, which is turned on interlocking with an off state of the contact 37 for switching circuit, causes to operate the command current value limiter contained in the arithmetic circuit 16 so that the command current value is reduced. As a result, the motor can be started with only one combination in this arrangement, and it is therefore possible to omit the coupling reactor (indicated by 68 in FIG. 5) and obtain an economical inverter device.

Embodiment 7.

Figure 7:
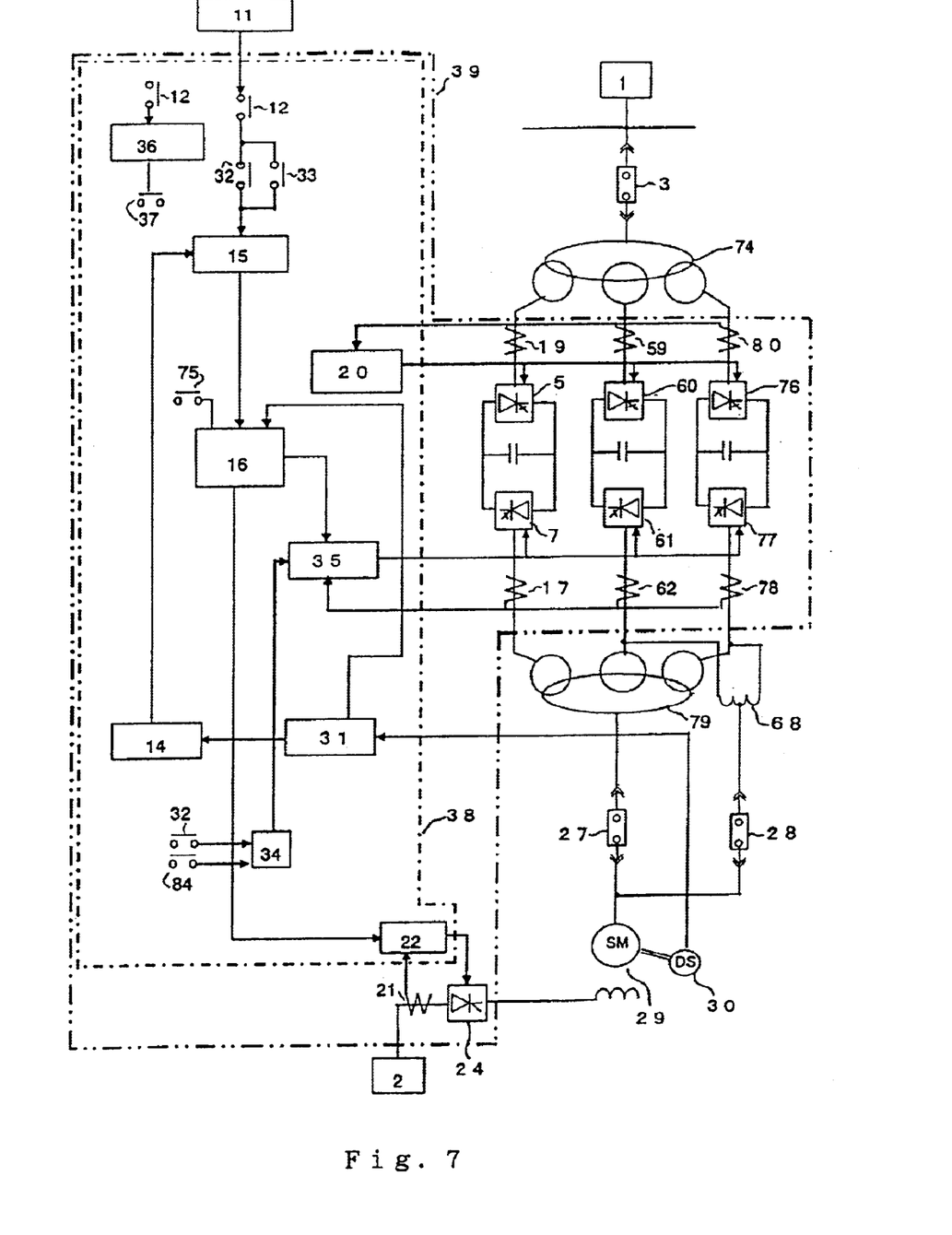
FIG. 7 is a circuit diagram showing an inverter device according to Embodiment 7 of the invention.

In the foregoing Embodiment 6, the parallel circuit is composed of two combinations of a power rectification main circuit and an inverse transformation main circuit, and the starting capacity (starting torque) of the alternating current motor is not larger than a half. On the other hand, as shown in FIG. 7, if the parallel circuit is composed of not less than three combinations (N combinations in general) and the starting capacity (starting torque) of the alternating current motor needs not larger than the rated capacity of a parallel circuit with one combination subtracted from the combinations composing the parallel circuit (N–1 combinations), the contact 75, which is turned on interlocking with an off state of the contact 37 for switching circuit, causes to operate the command current value limiter contained in the arithmetic circuit 16 so that the command current value is reduced to a capacity suitable for the starting torque in the parallel circuit in starting the motor. As a result, the motor can be started with only the combinations of the parallel circuit minus one combination in this arrangement, and consequently it is possible to omit any unnecessary coupling reactor and obtain an economical inverter device.

FIG. 7 shows a circuit diagram of this Embodiment 7. FIG. 7 differs from FIG. 6 of Embodiment 6 in the aspect that multi-winding transformers 74 and 79 are provided with a power rectification main circuit 76 and an inverse transformation main circuit 77 as a third parallel conversion circuit. Numerals 80 and 78 indicate current sensors. Operation of the circuit other than the foregoing description is the same as that in FIG. 6.

Embodiment 8.

Figure 8:
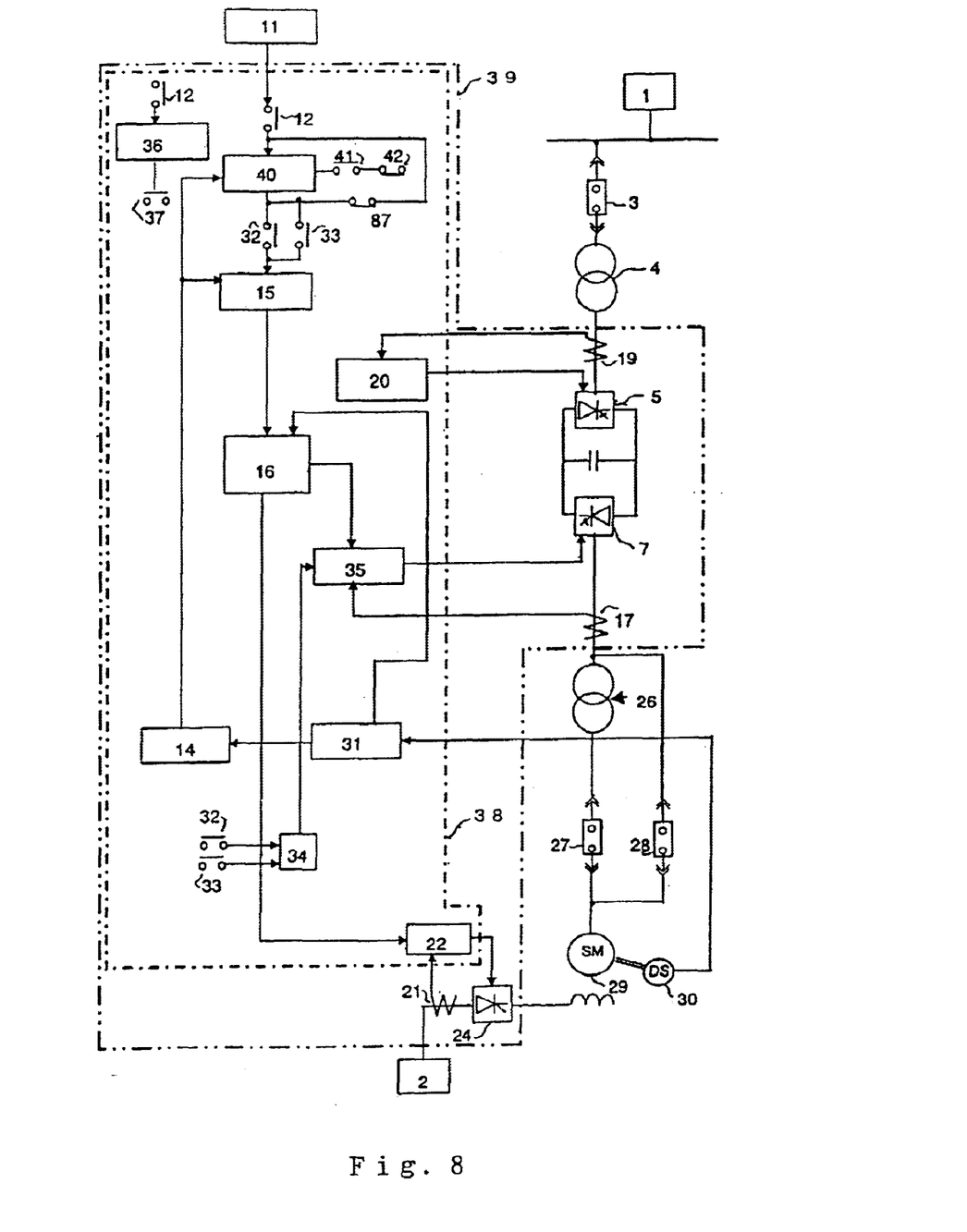
FIG. 8 is a circuit diagram showing an inverter device according to Embodiment 8 of the invention.

FIG. 8 is a diagram showing Embodiment 8 of the invention. This Embodiment 8 differs from the arrangement in FIG. 2 according to Embodiment 2 in the aspect that a bypass circuit for bypassing the speed command gradient generator 40 is disposed and that the circuit is provided with a contact 87 operated by a signal from outside.

In the foregoing Embodiment 2, the speed command gradient generator 40 is used for the purpose of restraining an overcurrent in switching to the circuit with an output transformer or to the circuit without any output transformer in starting the motor. On the other hand, in this Embodiment 8, at the time when the motor has started and shifted to normal operation, the contact 87 is closed by a signal from outside not shown so that the speed command gradient generator 40 is bypassed. As a result, it is possible to obtain an inverter device in which the operation follows the speed reference signal 11 more efficiently.

Embodiment 9.

Figure 9:
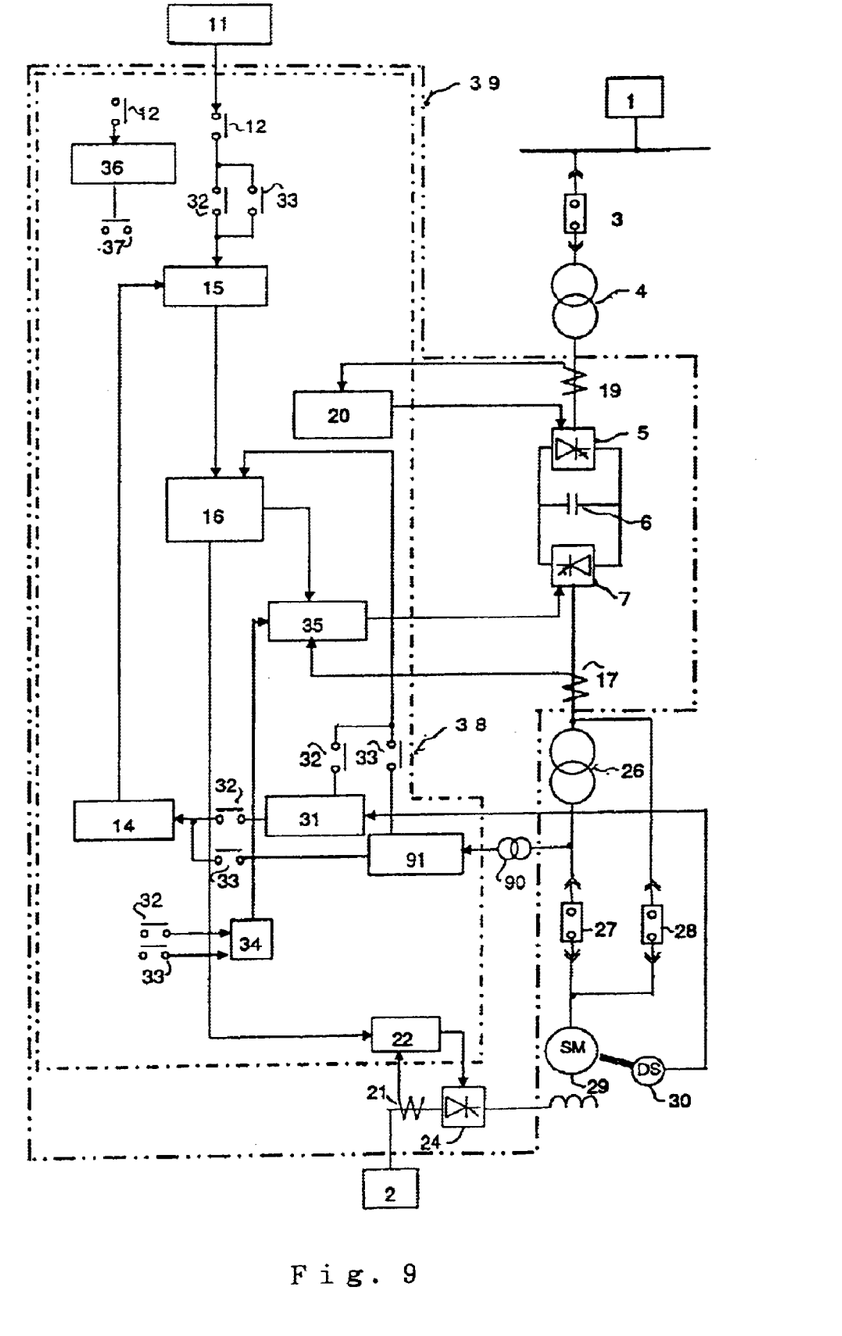
FIG. 9 is a circuit diagram showing an inverter device according to Embodiment 9 of the invention.

FIG. 9 is a circuit diagram showing Embodiment 9 of the invention. The inverter device according to this Embodiment 9 is provided with a transformer (PT) 90 connected to a secondary side of the output transformer 26, and a phase detector 91 for detecting a phase from the secondary output voltage of the transformer 90. This phase detector 91 is connected to the speed detector 14 and the arithmetic circuit 16 by the contact 33 under normal operation of the alternating current motor 29. In other words, a phase output is applied to the speed detector 14 and the arithmetic circuit 16 through the position detector 31 and the contact 32 at the time of starting the alternating current motor 29, and through the phase detector 91 and the contact 33 when the alternating current motor 29 is under normal operation.

In the foregoing Embodiment 1, only the distributor 30 is used to detect a position. On the other hand, in this Embodiment 9, by switching to an operation system in which the phase detector 91 detects a back voltage of the alternating current motor and the phase is computed under normal operation after bringing the motor into normal operation again, it is possible to obtain an inverter device that makes a stable control under high-speed operation.

Additional features and advantages of the inverter device according to the invention are hereinafter collectively described.

As a first additional feature of the inverter device of the invention, the inverter device according to claim 1, claim 9, or claim 14 preferably includes a speed command gradient generator of which output increases with respect to the time base, and in which the speed reference signal is given from the mentioned speed command gradient generator, and when the bypass circuit is interrupted and the alternating current synchronous motor is brought into normal operation after bypassing the mentioned transformer and starting the mentioned alternating current synchronous motor, a speed feedback value of the mentioned alternating current synchronous motor is used as an initial value of the speed reference signal of the mentioned speed command gradient generator.

In the inverter device of the mentioned first additional feature according to the invention, it is possible to restrain an overcurrent generated at the time of bringing the alternating current synchronous motor into normal operation again through the inverter circuit. Thus it is possible to make a start following the speed command value of the outside speed command generator without delay upon receipt of an operation command inputted from outside, and the motor can be started smoothly.

As a second additional feature of the inverter device of the invention, the inverter device according to claim 1, claim 9, or claim 14 preferably includes a speed command gradient generator of which output increases with respect to the time base, and in which a speed reference signal is given from the mentioned speed command gradient generator, and when the bypass circuit is interrupted and the alternating current synchronous motor is brought into normal operation after bypassing the mentioned transformer and starting the mentioned alternating current synchronous motor, a speed feedback value of the mentioned alternating current synchronous motor is used as an initial value of the speed reference signal of the mentioned speed command gradient generator, and the inverter device further includes a bypass circuit for bypassing the mentioned speed command gradient generator after bringing the mentioned alternating current synchronous motor into normal operation.

In the inverter device of the mentioned second additional feature according to the invention, it is possible to further improve follow-up characteristic to the speed reference signal.

As a third additional feature of the inverter device of the invention, in the inverter device according to claim 1, claim 9, or claim 14, rotation speed of the alternating current synchronous motor is preferably used in order to timely interrupt the bypass circuit and bring the mentioned alternating current synchronous motor into normal operation after bypassing the transformer and starting the mentioned alternating current synchronous motor.

In the inverter device of the mentioned third additional feature according to the invention, the speed of bringing the motor into normal operation is not changed by load conditions of the alternating current motor, and it is possible to prevent the output transformer from saturation.

As a fourth additional feature of the inverter device of the invention, the inverter device according to claim 1, claim 9, or claim 14 preferably includes a speed command gradient generator of which output increases with respect to the time base, and in which the speed reference signal is given from the mentioned speed command gradient generator, and when the bypass circuit is interrupted and the alternating current synchronous motor is brought into normal operation after bypassing the mentioned transformer and starting the mentioned alternating current synchronous motor, a speed feedback value of the mentioned alternating current synchronous motor is used as an initial value of the speed reference signal of the mentioned speed command gradient generator, and rotation speed of the mentioned alternating current synchronous motor is used in order to timely interrupt the bypass circuit and bring the mentioned alternating current synchronous motor into normal operation after bypassing the mentioned transformer and starting the mentioned alternating current synchronous motor.

In the inverter device of the mentioned fourth additional feature according to the invention, the speed of bringing the motor into normal operation is not changed by load conditions of the alternating current motor, and it is possible to prevent the output transformer from saturation.

As a fifth additional feature of the inverter device of the invention, the inverter device according to claim 1 preferably includes a speed command gradient generator of which output increases with respect to the time base, and in which the speed reference signal is given from the mentioned speed command gradient generator, and the inverter device further includes a bypass circuit for bypassing the mentioned speed command gradient generator after interrupting the bypass circuit for bypassing the transformer and bringing the alternating current synchronous motor into normal operation after starting the mentioned alternating current synchronous motor bypassing the mentioned transformer.

In the inverter device of the mentioned fifth additional feature according to the invention, it is possible to further improve follow-up characteristic to the speed reference signal.

As a sixth additional feature of the inverter device of the invention, in the inverter device according to claim 1, a distributor combined with a rotary shaft of the alternating current synchronous motor preferably detects a position of a rotor of the mentioned alternating current synchronous motor.

The inverter device of the mentioned sixth additional feature according to the invention is applicable to start and drive of an alternating current synchronous motor of high-speed rotation.

As a seventh additional feature of the inverter device of the invention, the inverter device according to claim 1 preferably includes: a rotor position detector for detecting a position of a rotor of the alternating current synchronous motor using a distributor combined with a rotary shaft of the mentioned alternating current synchronous motor; and a phase detector for detecting a position of the rotor of the mentioned alternating current synchronous motor on the basis of back voltage of the mentioned alternating current synchronous motor; and in which the position of the mentioned rotor is detected on the basis of an output of the mentioned rotor position detector at the time of starting the mentioned alternating current synchronous motor and on the basis of an output of the phase detector under normal operation of the mentioned alternating current synchronous motor.

In the inverter device of the mentioned seventh additional feature according to the invention, it is possible to make stable control with respect to high-speed operation of the alternating current synchronous motor.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. An inverter device comprising:
   a power rectification circuit for converting alternating current power into direct current power;
   an inverse transformation control circuit connected to a direct current output terminal of said power rectification circuit for converting the converted direct current power into alternating current power;
   an output transformer for raising voltage interposed between an alternating current output terminal of the inverse transformation control circuit and an alternating current synchronous motor;
   a PWM control circuit for PWM controlling said inverse transformation control circuit according to a current command value generated by comparing a speed reference signal with a speed feedback signal of said alternating current synchronous motor;
   a bypass circuit for switching so as to bypass said transformer when the motor is started and to pass said transformer at a predetermined time after starting of the motor; and a maximum voltage limit value switch for limiting a maximum output voltage of said inverse transformation control circuit to a value at which a given low voltaae start is enabled at the time of the bypassing operation and to a value at which a given high voltage start is enabled at the time of the passing operation.

2. The inverter device according to claim 1, further comprising a speed command gradient generator of which output increases with respect to the time base, wherein said speed reference signal is given from said speed command gradient generator, and when said bypass circuit is interrupted and said alternating current synchronous motor is brought into normal operation after bypassing said transformer and starting said alternating current synchronous motor, a speed feedback value of said alternating current synchronous motor is used as an initial value of the speed reference signal of said speed command gradient generator.

3. The inverter device according to claim 1, further comprising a speed command gradient generator of which output increases with respect to the time base, wherein said speed reference signal is given from said speed command gradient generator, and when said bypass circuit is interrupted and said alternating current synchronous motor is brought into normal operation after bypassing said transformer and starting said alternating current synchronous motor, a speed feedback value of said alternating current synchronous motor is used as an initial value of the speed reference signal of said speed command gradient generator;

the inverter device further including a bypass circuit for bypassing said speed command gradient generator after bringing the mentioned alternating current synchronous motor into normal operation.

4. The inverter device according to claim 1, wherein rotation speed of said alternating current synchronous motor is used in order to timely interrupt said bypass circuit and bring said alternating current synchronous motor into normal operation after bypassing said transformer and starting said alternating current synchronous motor.

5. The inverter device according to claim 1, further comprising a speed command gradient generator of which output increases with respect to the time base, wherein said speed reference signal is given from said speed command gradient generator, and when said bypass circuit is interrupted and said alternating current synchronous motor is brought into normal operation after bypassing said transformer and starting said alternating current synchronous motor, a speed feedback value of said alternating current synchronous motor is used as an initial value of the speed reference signal of said speed command gradient generator, and rotation speed of said alternating current synchronous motor is used in order to timely interrupt said bypass circuit and bring said alternating current synchronous motor into normal operation after bypassing said transformer and starting said alternating current synchronous motor.

6. The inverter device according to claim 1, further comprising a speed command gradient generator of which output increases with respect to the time base, wherein said speed reference signal is given from said speed command gradient generator, the inverter device further including a bypass circuit for bypassing said speed command gradient generator after interrupting said bypass circuit and bringing said alternating current synchronous motor into normal operation after bypassing said transformer and starting said alternating current synchronous motor.

7. The inverter device according to claim 1, further comprising a distributor combined with a rotary shaft of said alternating current synchronous motor, wherein said distributor detects a position of a rotor of said alternating current synchronous motor.

8. The inverter device according to claim 1, further comprising:

a rotor position detector for detecting a position of a rotor of said alternating current synchronous motor using a distributor combined with a rotary shaft of said alternating current synchronous motor; and a phase detector for detecting a position of the rotor of said alternating current synchronous motor on the basis of back voltage of said alternating current synchronous motor;

wherein a position of the mentioned rotor is detected on the basis of an output of said rotor position detector at the time of starting said alternating current synchronous motor and on the basis of an output of the phase detector under normal operation of said alternating current synchronous motor.

9. An inverter device comprising:

N combinations of:

a power rectification circuit for converting alternating current power inputted from a multi-winding transformer into direct current power; and an inverse transformation control circuit connected to a direct current output terminal of said power rectification circuit for converting said converted direct current power into alternating current power;

a multi-winding output transformer for raising voltage interposed between an alternating current output terminal of said inverse transformation control circuit and an alternating current synchronous motor;

a PWM control circuit for PWM controlling the inverse transformation control circuit according to a current command value generated by comparing a speed reference signal with a speed feedback signal of said alternating current synchronous motor;

a bypass circuit for switching so as to bvpass said transformer through an alternating current reactor for coupling at least two of said N combinations of the inverse transformation control circuit when the motor is started and to pass said transformer at a predetermined time after the start of motor; and a maximum voltage limit value switch for limiting a maximum output voltage of the inverse transformation control circuit to a value where a given low voltage start is enabled at the time of the bypassing operation and to a value where a given high voltage start is enabled at the time of the passing operation.

10. The inverter device according to claim 9, further comprising a speed command gradient generator of which output increases with respect to the time base, wherein said speed reference signal is given from said speed command gradient generator, and when said bypass circuit is interrupted and said alternating current synchronous motor is brought into normal operation after bypassing said transformer and starting said alternating current synchronous motor, a speed feedback value of said alternating current synchronous motor is used as an initial value of the speed reference signal of said speed command gradient generator.

11. The inverter device according to claim 9, further comprising a speed command gradient generator of which output increases with respect to the time base,
  wherein said speed reference signal is given from said speed command gradient generator, and when said bypass circuit is interrupted and said alternating current synchronous motor is brought into normal operation after bypassing said transformer and starting said alternating current synchronous motor, a speed feedback value of said alternating current synchronous motor is used as an initial value of the speed reference signal of said speed command gradient generator;
  the inverter device further including a bypass circuit for bypassing said speed command gradient generator after bringing the mentioned alternating current synchronous motor into normal operation.

12. The inverter device according to claim 9, wherein rotation speed of said alternating current synchronous motor is used in order to timely interrupt said bypass circuit and bring said alternating current synchronous motor into normal operation after bypassing said transformer and starting said alternating current synchronous motor.

13. The inverter device according to claim 9, further comprising a speed command gradient generator of which output increases with respect to the time base,
  wherein said speed reference signal is given from said speed command gradient generator, and when said bypass circuit is interrupted and said alternating current synchronous motor is brought into normal operation after bypassing said transformer and starting said alternating current synchronous motor, a speed feedback value of said alternating current synchronous motor is used as an initial value of the speed reference signal of said speed command gradient generator, and rotation speed of said alternating current synchronous motor is used in order to timely interrupt said bypass circuit and bring said alternating current synchronous motor into normal operation after bypassing said transformer and starting said alternating current synchronous motor.

14. An inverter device comprising:
  N combinations of:
  a power rectification circuit for converting alternating current power inputted from a multi-winding transformer into direct current power; and
  an inverse transformation control circuit connected to a direct current output terminal of said power rectification circuit for converting the converted direct current power into alternating current power;
  a multi-winding output transformer for raising voltage internosed between an alternating current output terminal of said inverse transformation control circuit and an alternating current synchronous motor;
  a PWM control circuit for PWM controlling said inverse transformation control circuit according to a current command value generated by comparing a speed reference signal with a speed feedback signal of said alternating current synchronous motor;
  a bypass circuit for switching so as to bypass said transformer when the motor is started and to pass said transformer at a predetermined time after starting of the motor; and
  a maximum voltage limit value switch for limiting a maximum output voltage of the inverse transformation control circuit to a value at which a given low voltage start is enabled at the time of the bypassing operation and to a value at which a given high voltage start is enabled at the time of the passing operation.

15. The inverter device according to claim 14, further comprising a speed command gradient generator of which output increases with respect to the time base,
  wherein said speed reference signal is given from said speed command gradient generator, and when said bypass circuit is interrupted and said alternating current synchronous motor is brought into normal operation after bypassing said transformer and starting said alternating current synchronous motor, a speed feedback value of said alternating current synchronous motor is used as an initial value of the speed reference signal of said speed command gradient generator.

16. The inverter device according to claim 14, further comprising a speed command gradient generator of which output increases with respect to the time base,
  wherein said speed reference signal is given from said speed command gradient generator, and when said bypass circuit is interrupted and said alternating current synchronous motor is brought into normal operation after bypassing said transformer and starting said alternating current synchronous motor, a speed feedback value of said alternating current synchronous motor is used as an initial value of the speed reference signal of said speed command gradient generator;
  the inverter device further including a bypass circuit for bypassing said speed command gradient generator after bringing the mentioned alternating current synchronous motor into normal operation.

17. The inverter device according to claim 14, wherein rotation speed of said alternating current synchronous motor is used in order to timely interrupt said bypass circuit and bring said alternating current synchronous motor into normal operation after bypassing said transformer and starting said alternating current synchronous motor.

18. The inverter device according to claim 14, further comprising a speed command gradient generator of which output increases with respect to the time base,
  wherein said speed reference signal is given from said speed command gradient generator, and when said bypass circuit is interrupted and said alternating current synchronous. motor is brought into normal operation after bypassing said transformer and starting said alternating current synchronous motor, a speed feedback value of said alternating current synchronous motor is used as an initial value of the speed reference signal of said speed command gradient generator, and rotation speed of said alternating current synchronous motor is used in order to timely interrupt said bypass circuit and bring said alternating current synchronous motor into normal operation after bypassing said transformer and starting said alternating current synchronous motor.

* * * * *